United States Patent
Prabhu et al.

(10) Patent No.: US 9,250,153 B2
(45) Date of Patent: Feb. 2, 2016

(54) METHODS AND SYSTEMS FOR MONITORING HEALTH OF BLADES

(71) Applicant: General Electric Company, Schenectady, NY (US)

(72) Inventors: Rahul Srinivas Prabhu, Bangalore (IN); Mahalakshmi Shunmugam Balasubramaniam, Bangalore (IN); Ajay Kumar Behera, Bangalore (IN); Aninda Bhattacharya, Bangalore (IN); Venkatesh Rajagopalan, Bangalore (IN); Prashanth D'Souza, Bangalore (IN); Vivek Venugopal Badami, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 646 days.

(21) Appl. No.: 13/665,135

(22) Filed: Oct. 31, 2012

(65) Prior Publication Data

US 2014/0119889 A1    May 1, 2014

(51) Int. Cl.
*F01D 25/00*  (2006.01)
*G01M 5/00*  (2006.01)
*G01B 7/14*  (2006.01)

(52) U.S. Cl.
CPC ............... *G01M 5/0083* (2013.01); *G01B 7/14* (2013.01); *G01M 5/0091* (2013.01)

(58) Field of Classification Search
CPC .......... F01D 7/00; F01D 11/14; F01D 11/20; F01D 11/22; G01B 7/14; G01M 5/0083; G01M 5/0091
USPC ............. 324/207.13, 207.15, 207.16; 415/14, 415/118, 173.2, 173.3
See application file for complete search history.

(56) References Cited

U.S. PATENT DOCUMENTS

| | | | | |
|---|---|---|---|---|
| 4,326,804 A * | 4/1982 | Mossey | | 356/623 |
| 4,518,917 A | 5/1985 | Oates et al. | | |
| 4,967,153 A | 10/1990 | Langley | | |
| 5,140,494 A * | 8/1992 | Slade | | 361/212 |
| 5,497,101 A * | 3/1996 | Fillion | | 324/662 |
| 5,545,007 A * | 8/1996 | Martin | | 415/173.2 |
| 6,927,567 B1 | 8/2005 | Roeseler et al. | | |
| 8,876,460 B2 * | 11/2014 | Willett, Jr. | | 415/1 |
| 2003/0060986 A1 * | 3/2003 | Flotow | | 702/36 |

(Continued)

FOREIGN PATENT DOCUMENTS

WO    2005073667 A1    8/2005

OTHER PUBLICATIONS

Lawrence et al., "Tip Clearance Signal Processor Development", Aero Propulsion Laboratory (AFWAL/POTX); Air Force Wright Aeronautical Laboratories, Oct. 1988; 55 Pages.

(Continued)

*Primary Examiner* — Igor Kershteyn
*Assistant Examiner* — Woody A Lee, Jr.
(74) *Attorney, Agent, or Firm* — Ann M. Agosti

(57) ABSTRACT

A system is disclosed. The system includes a processing subsystem that determines preliminary voltages corresponding to a plurality of blades based upon blade passing signals (BPS), and generates a plurality of clearance values by normalizing the preliminary voltages for effects of one or more operational parameters, wherein the plurality of clearance values are representative of clearance of the plurality of blades.

13 Claims, 6 Drawing Sheets

(56) References Cited

U.S. PATENT DOCUMENTS

| | | | |
|---|---|---|---|
| 2003/0222640 A1* | 12/2003 | Twerdochlib et al. | ... 324/207.17 |
| 2009/0281766 A1 | 11/2009 | Chan et al. | |
| 2010/0079136 A1* | 4/2010 | Phillips et al. | ........... 324/207.16 |
| 2010/0161245 A1 | 6/2010 | Rai et al. | |
| 2010/0191502 A1 | 7/2010 | Ren et al. | |
| 2011/0243708 A1 | 10/2011 | Hafner | |
| 2012/0035861 A1 | 2/2012 | Hadley et al. | |
| 2012/0069355 A1 | 3/2012 | Hynous | |

OTHER PUBLICATIONS

EP Search Report and Written Opinion issued Mar. 21, 2014 in connection with corresponding EP Application No. 13189169.9.

* cited by examiner

METHODS AND SYSTEMS FOR MONITORING HEALTH OF BLADES

BACKGROUND

Embodiments of the invention relate generally to the field of prognostics of blades or airfoils, and more specifically to methods and systems for determination of health of blades.

Rotor blades or airfoils are used in several devices, for example, axial compressors, turbines, engines, turbomachines, or the like. An axial compressor has a series of stages with each stage comprising a row of rotor blades or airfoils followed by a row of static blades or static airfoils. Accordingly, each stage comprises a pair of rotor blades or airfoils and static airfoils. In an axial compressor, the rotor blades increase the kinetic energy of a fluid that enters the axial compressor through an inlet. Furthermore, the static blades generally convert the increased kinetic energy of the fluid into static pressure through diffusion. Accordingly, the rotor blades and static blades play an important role to increase the pressure of the fluid.

Furthermore, the rotor blades or airfoils and the static airfoils are vital due to wide and varied applications of the axial compressors that include the airfoils. Axial compressors, for example, may be used in a number of devices, such as, land based gas turbines, jet engines, high speed ship engines, small scale power stations, or the like. In addition, the axial compressors may be used in other applications, such as, large volume air separation plants, blast furnace air, fluid catalytic cracking air, propane dehydrogenation, or the like.

The blades or airfoils operate for long hours under extreme and varied operating conditions, such as, high speed, fluid load, and temperature that affect the health of the airfoils. In addition to the extreme and varied conditions, certain other factors lead to fatigue and stress on the airfoils. The factors, for example, may include centrifugal forces, fluid forces, thermal loads during transient events, load due to non-synchronous vibration, such as, rotating stall, and the cyclic load due to synchronous resonant vibration. Prolonged effects of the factors lead to defects, such as, tip loss, or deflection in the airfoils.

Accordingly, it is highly desirable to develop a system and method that may predict health of airfoils in real time. More particularly, it is desirable to develop a system and method that may predict cracks or fractures in real time.

BRIEF DESCRIPTION

A system is disclosed. The system includes a processing subsystem that determines preliminary voltages corresponding to a plurality of blades based upon blade passing signals (BPS), and generates a plurality of clearance values by normalizing the preliminary voltages for effects of one or more operational parameters, wherein the plurality of clearance values are representative of clearance of the plurality of blades.

A method is disclosed. The method includes the steps of determining preliminary voltages corresponding to a plurality of blades based upon blade passing signals (BPS), and generating a plurality of clearance values by normalizing the preliminary voltages for effects of one or more operational parameters, wherein the plurality of clearance values are representative of clearance of the plurality of blades.

DRAWINGS

These and other features, aspects, and advantages of the present invention will become better understood when the following detailed description is read with reference to the accompanying drawings in which like characters represent like parts throughout the drawings, wherein.

Figure 6:
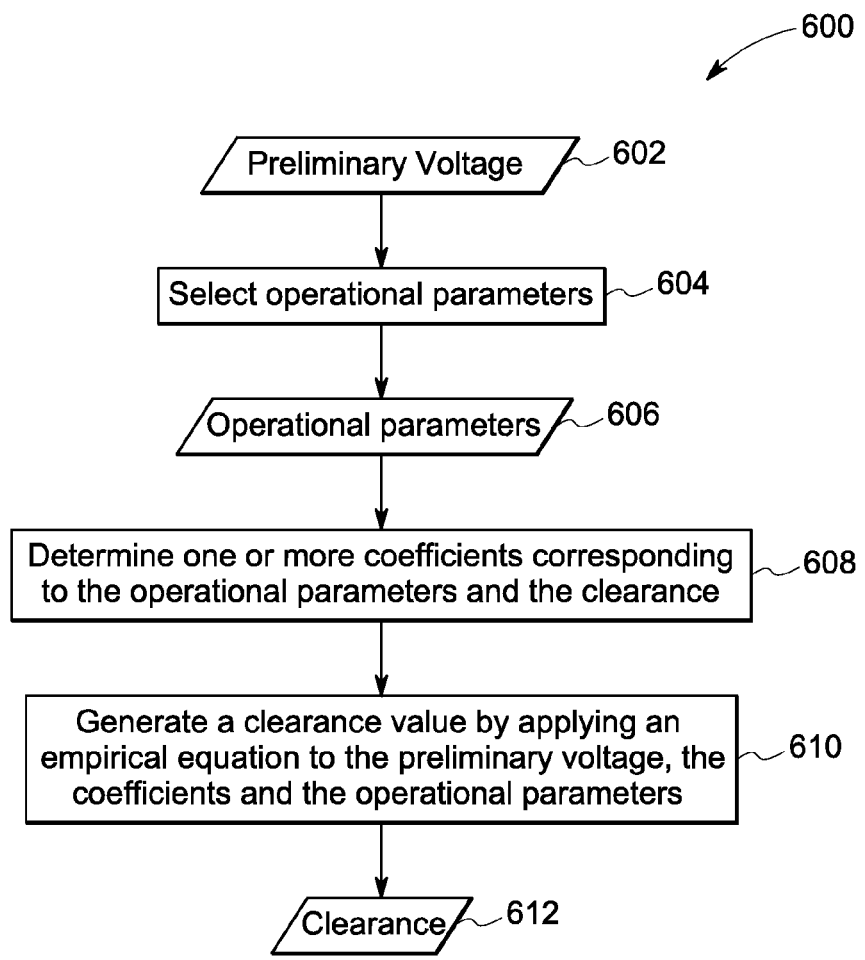
Figure 7A:
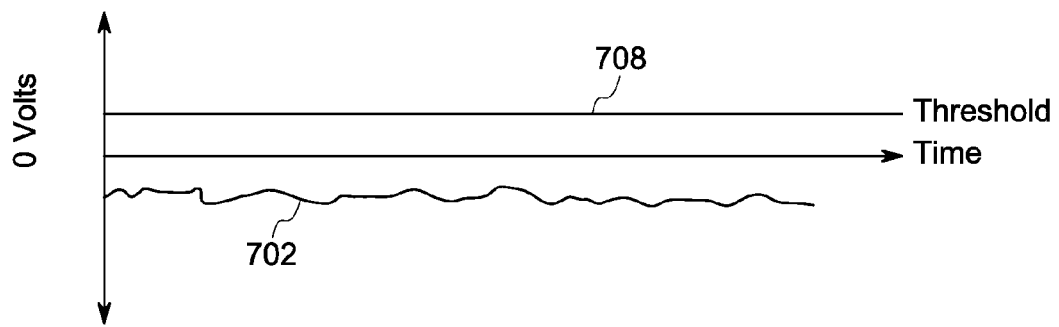
Figure 7B:
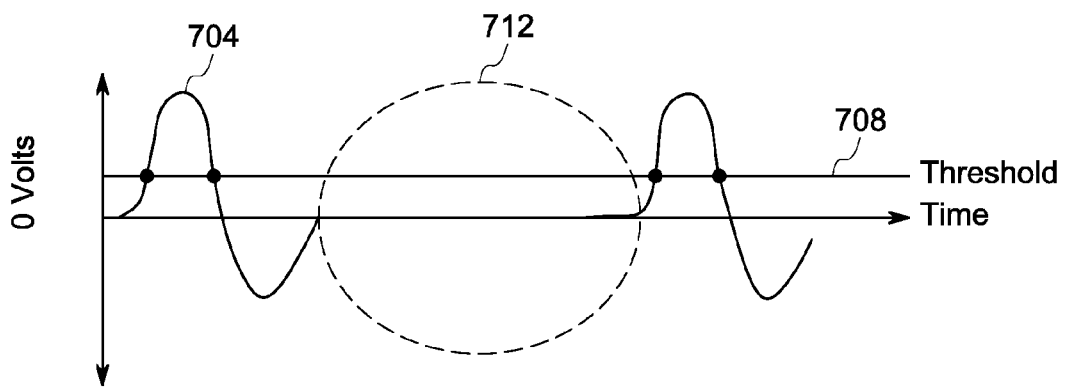
Figure 7C:
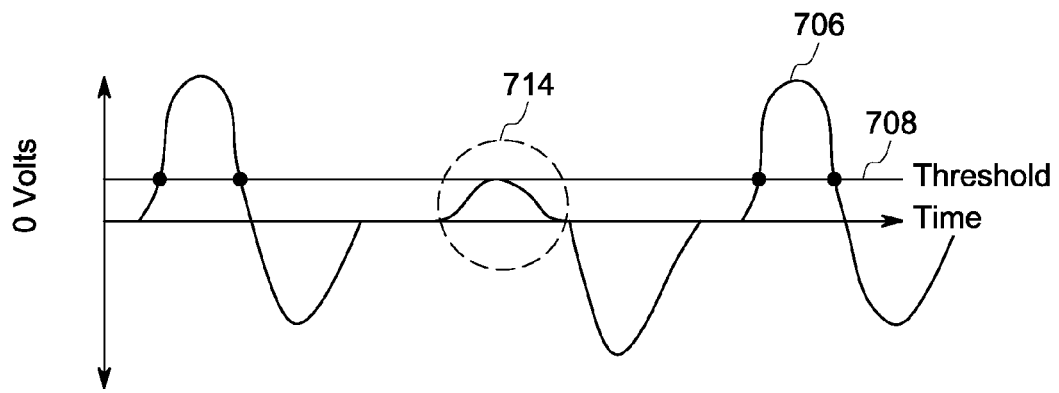

FIG. 6 is a flowchart that illustrates an exemplary method for determination of a clearance value corresponding to a blade, in accordance with aspects of the present techniques; and FIG. 7a, FIG. 7b and FIG. 7c are exemplary graphical representations of blade passing signals 702, 704, 706 that are shown for describing certain embodiments of preset rules, in accordance with certain aspects of the present techniques.

DETAILED DESCRIPTION

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "clearance" may refer to a distance or spacing between two objects. Typically, compressors include blades that are covered by a casing. The radial distance between the blades and the casing or sensors located on the casing is generally referred to as clearance of the blades. Additionally, the term "clearance" may also be used to refer to radial distances between the tips of the blades and the internal surface of the casing. Clearance may be used for determination of the health of the blades, and prevention of the compressors from damage. For example, an increase in the clearance of a blade A may be due to a bend, a tip loss, or a crack in the blade A. Similarly, a reduction in the clearance of the blade A may be due to reseating of the blade A. Additionally, it is noted that the reduction in the clearance of the blade A may result in crashing of the blade A. The crashing of the blade A may result in cracks in the blade A or other damage to a compressor or a turbine engine that includes the blade A. Therefore, real-time estimation and monitoring of clearance is required. As discussed in detail below, embodiments of the present systems and methods estimate and monitor clearance between two objects, such as, clearance between a turbine blade and a casing, in real-time. Furthermore, embodiments of the present systems and techniques monitor the health of the blades in real-time.

Figure 1:
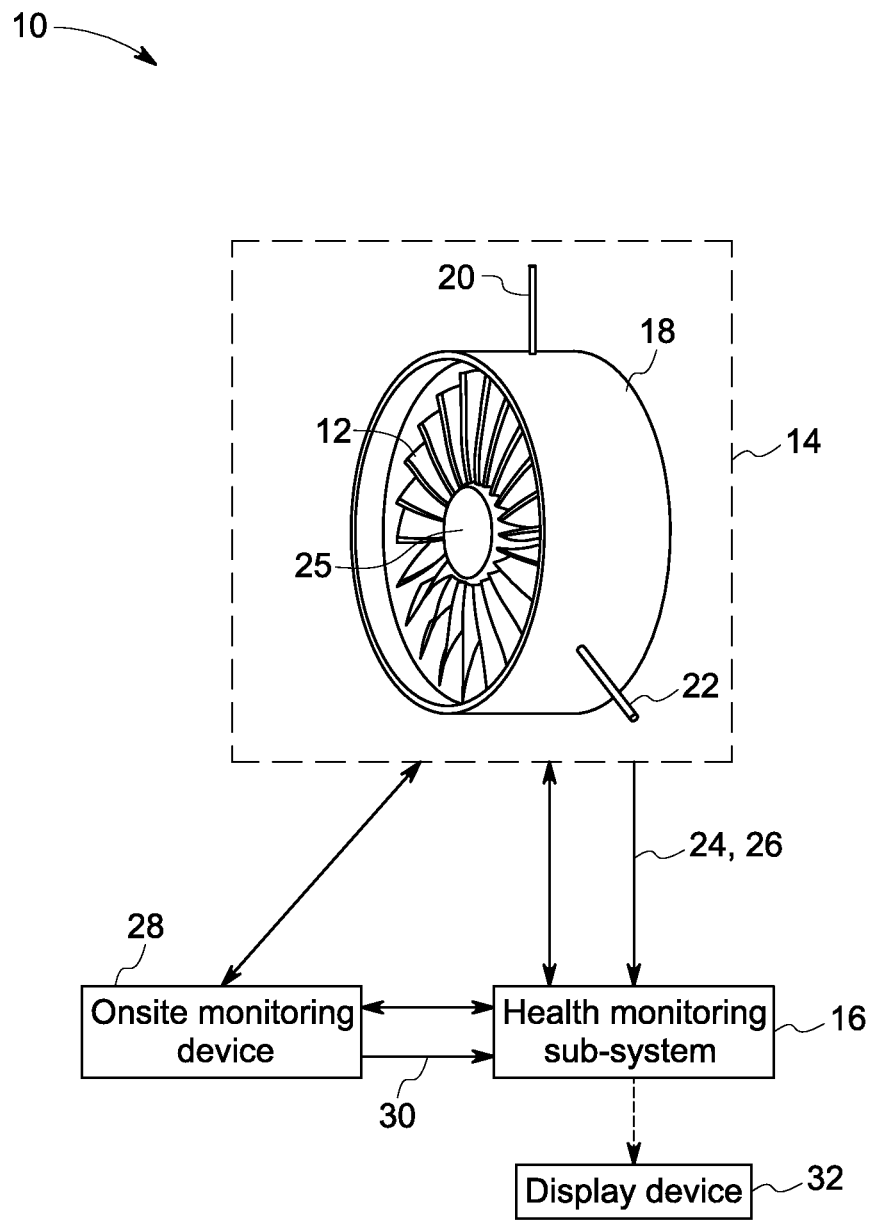
FIG. 1 is a diagrammatic illustration of a system for determination of the health of a plurality of blades, in accordance with exemplary aspects of the present techniques.

As discussed in detail below, embodiments of the present techniques determine clearance between two objects in various systems, such as, a steam turbine, a gas turbine, an axial compressor, and so forth. FIG. 1 is a diagrammatic illustration of a system 10 for determination of the health of a plurality of blades 12. The system 10 includes a device 14 and a health monitoring sub-system 16. The device 14, for example, may be a turbine engine, a compressor, a turbine, or the like. In the presently contemplated configuration, the system 10 is shown to include a portion of the device 14. In the presently contemplated configuration, the device 14 is a turbine engine, and the portion of the device 14 is a compressor.

As shown in FIG. 1, the health monitoring sub-system 16 is in an operational communication with the compressor 14. The health monitoring sub-system 16, for example, may be a processing subsystem, a computing device, or the like. In one embodiment, the health monitoring sub-system 16 may be located in vicinity of the device 14. In another embodiment, the health monitoring sub-system 16 may be located in a cloud. In still another embodiment, the health monitoring sub-system 16 may be located at a remote location with respect to the location of the device 14.

The compressor 14 includes the blades 12 that are covered by a casing 18. In the illustrated embodiment, the system 10 includes a plurality of sensors 20, 22 that are operationally coupled to the health monitoring sub-system 16. In one embodiment, the sensors 20, 22 are electromagnetic sensors or eddy current sensors. The sensors 20, 22, for example may be a magnetic sensor, a capacitive sensor, an eddy current sensor, or the like. In operation, the sensors 20, 22 generate blade passing signals (BPS) 24, 26 when a blade in the blades 12 passes through under the sensors 20, 22. Particularly, the sensor 20 generates the BPS 24, and the sensor 22 generates the BPS 26. A blade that passes through under the sensors 20, 22, for example, may be identified by dividing a total time period for a revolution of a rotor 25 of the blades 12 by a total number of blades 12 in the rotor 25.

In one embodiment, when the sensors 20, 22 are magnetic sensors, each of the sensors 20, 22 may include a magnet core surrounded by a coil. For example, if the sensor 20 includes a magnet core M (now shown) that is surrounded by a coil C (not shown), then the magnet core M is ensconced within the coil C. The magnet core M produces a magnetic flux field. During operation of the device 10, when a blade in the blades 12 approaches the magnetic flux field produced by the magnet core M, the blade in the blades 12 changes the permeability of a distance/spacing between the blade and the casing 18. When the blade disrupts the magnetic flux field by cutting the magnetic flux field, a voltage is induced in the coil C in the sensor 20. Consequently the sensor 20 generates the signals 24 that are representative of the induced voltage in the coil C. Accordingly, in one embodiment, when the sensors 20, 22 are magnetic sensors, the sensors 20, 22 generate BPS signals 24, 26 that are representative of induced voltages in respective coils of the sensors 20, 22. An exemplary BPS is described in detail with reference to FIG. 2.

The system 10 further includes an onsite monitoring device 28. The onsite monitoring device 28 is in an operational communication with the device 14 and the health monitoring sub-system 16. The onsite monitoring device 28 receives data from the device 14, and generates operational parameters 30 based upon the received data. The operational parameters 30, for example, include a speed of the device 14, a temperature of the device 14 at the time of generation of the BPS 24, 26, an inlet guide vane parameter, or the like. Furthermore, the onsite monitoring device 28 transmits the operational parameters to the health monitoring sub-system 16.

Additionally, as shown in FIG. 1, the sensors 20, 22 transmit the BPS 24, 26 to the health monitoring sub-system 16. The health monitoring sub-system 16 receives the BPS 24, 26 from the sensors 20, 22. Furthermore, the health monitoring sub-system 16 determines and monitors the health of the blades 12 based upon the BPS 24, 26 and one or more of the operational parameters 30, in real-time. In certain embodiments, the health monitoring sub-system 16 determines clearance of the blades 12 based upon the BPS 24, 26 and one or more of the operational parameters 30.

Particularly, the health monitoring sub-system 16 determines preliminary voltages corresponding to the blades 12 based upon the BPS 24, 26. Furthermore, the health monitoring sub-system 16 normalizes the preliminary voltages for effects of one or more of the operational parameters 30 to generate a plurality of clearance values. In one embodiment, the health monitoring sub-system 16 determines and monitors the clearance of the blades 12 in real-time. It is noted that the clearance values are representative of the clearance of the blades 12. The determination of the clearance and the health of the blades 12 are explained in greater detail with reference to FIG. 3.

Furthermore, in certain embodiments, the health monitoring subsystem 16 generates one or more alarms to indicate defects in the blades 12 or the sensors 20, 22. The health monitoring sub-system 16 generates the alarms based upon the preliminary voltages or the clearance values. Generation of the alarms is explained in detail with reference to FIG. 3. As shown in FIG. 1, the system 10 includes a display device 32 that is in an operational communication with the health monitoring system 16. The display device 32, displays the BPS 24, 26, the clearance values, one or more intermediate processes or values, the alarms, or the like.

Figure 2:
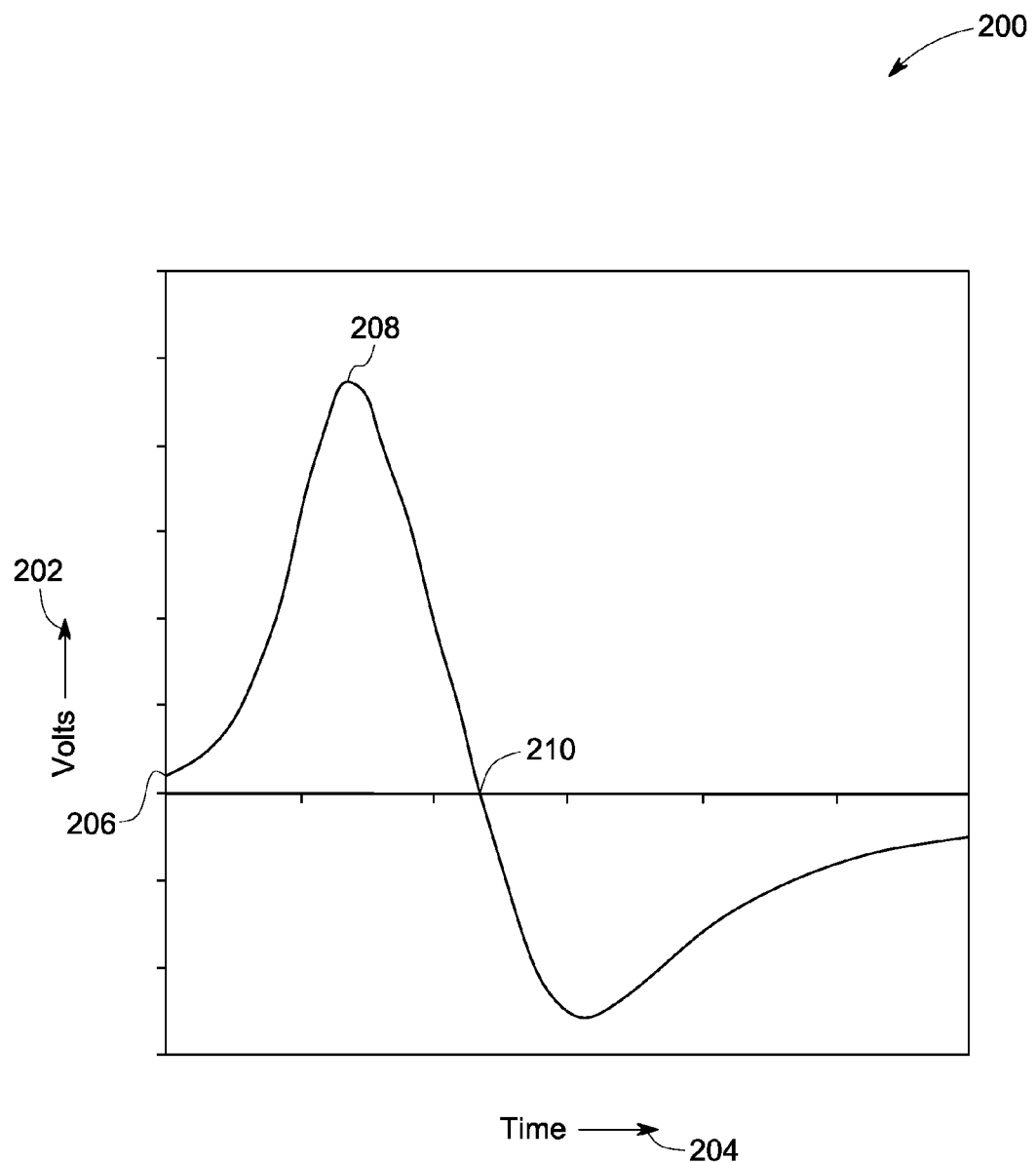
FIG. 2 is a graphical representation of an experimental blade passing signal, in accordance with aspects of the present techniques.

FIG. 2 is a graphical representation of an experimental BPS 200, in accordance with one embodiment of the present techniques. The BPS signal 200, for example, may be one of the BPS 24, 26 generated by the sensors 20, 22, respectively. For ease of understanding the BPS 200 will be explained assuming that the BPS 200 corresponds to a blade A, and is generated by the sensor 20. Furthermore, in the presently contemplated configuration, the sensor 20 is a magnetic sensor. In the present embodiment, when the sensor 20 is assumed to be a magnetic sensor, the BPS 200 shown in FIG. 2 is a graphical representation of a voltage induced in respective coil of the sensor 20 (see FIG. 1). For ease of understanding, the BPS 200 will be explained assuming that the device 14 that includes the sensor 20 is operating in ideal conditions. In the ideal conditions, noise induced in the BPS 200 is substantially minimal.

As shown in FIG. 2, Y-axis 202 represents voltage generated by the sensor 20, and X-axis 204 represents time of generation of the voltage. At a point 206, the leading edge of the blade A starts disrupting the magnetic flux of the sensor 20, and the disruption increases with time leading to an increase in the voltage, and finally reaches a maximum value as shown by reference numeral 208. It is noted that the sensor 20 generates the maximum voltage 208 when the leading edge of the blade A reaches the center of the sensor tip 20. When the leading edge of the blade A leaves the tip of the sensor 20, the voltage starts falling from the maximum value 208. Furthermore, when the trailing edge of the blade A reaches the tip of the sensor 20, the voltage reaches a minimum value as shown by reference numeral 210.

Figure 3:
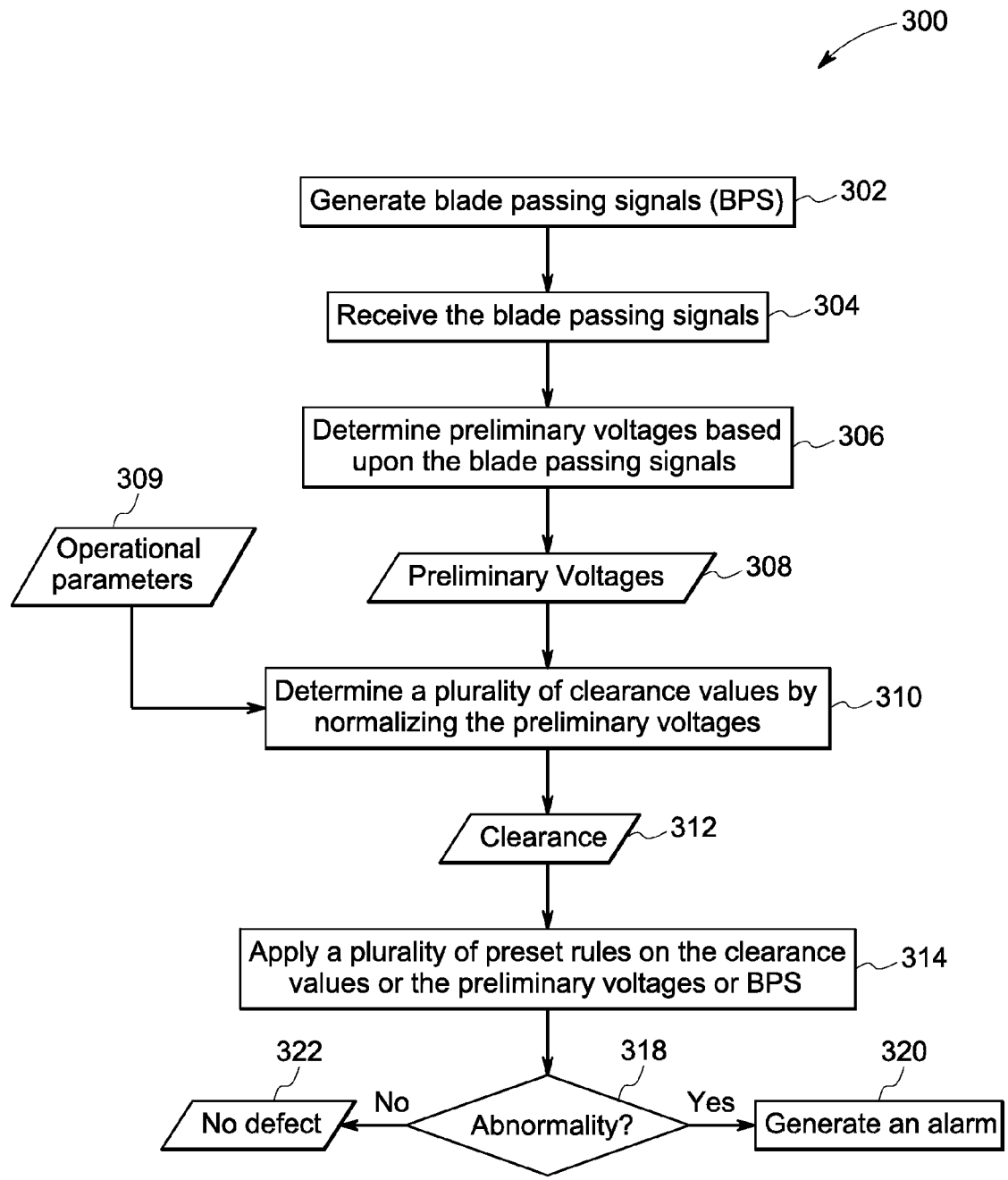
FIG. 3 is a flow chart illustrating an exemplary method for determination of clearance of blades, in accordance with aspects of the present techniques.

FIG. 3 is a flow chart 300 illustrating an exemplary method for determination of clearance of blades, in accordance with aspects of the present technique. At step 302, blade passing signals corresponding to a plurality of blades are generated. The blade passing signals may correspond to the blades 12 (see FIG. 1), and may be generated by the sensors 20, 22 (see FIG. 1). For example, the blade passing signals may be the blade passing signals (BPS) 24, 26 (see FIG. 1). At step 304, the BPS are received. The BPS, for example, may be received by the health monitoring sub-system 16 (see FIG. 1). Furthermore, at step 306, preliminary voltages 308 corresponding to the blades may be determined based upon the BPS. In one embodiment, the preliminary voltages 308 may be determined based upon a subset of the BPS. For example, the preliminary voltages may be determined based upon a subset of the BPS that is generated during steady state of a device that includes the blades. Determination of the preliminary voltages 308 based upon the BPS is explained in detail with reference to FIG. 4.

Subsequently at step 310, a plurality of clearance values 312 may be determined. The clearance values 312 may be determined by normalizing the preliminary voltages 308 for effects of one or more operational parameters 309. The operational parameters 309, for example, may include a speed of a device that includes the blades, a temperature of the device at the time of generation of the BPS, an inlet guide vane parameter, or the like. The operational parameters 309, for example, may be the operational parameters 30 (see FIG. 1). It is noted that the clearance values 312 are representative of the clearance of the blades, such as, the blades 12 (see FIG. 1). The determination of the clearance values 312, in accordance with one embodiment is explained in detail with reference to FIG. 6.

Subsequently at step 314, a plurality of preset rules are applied to the clearance values 312, the preliminary voltages 308, and/or the BPS. The preset rules, for example, may include comparison of the clearance values 312 or the preliminary voltages 308 to a plurality of thresholds. In one embodiment, the preset rules are applied to the blade passing signals to determine existence of defects in sensors, such as, the sensors 24, 26, or the blades 12. Certain examples of the preset rules are explained with reference to FIGS. 7(a), 7(b) and 7(c). At step 318, a determination is made whether the blades, such as, the blades 12, or sensors, such as, the sensors 20, 22 have a defect. The determination is made based upon the application of the preset rules to the preliminary voltages 308, the clearance values 312 and/or the BPS. At step 318, when it is determined that there are one or more defects in one or more of the blades or the sensors, the control is transferred to step 320. At step 320, an alarm is generated to indicate the one or more defects in the one or more of the blades. Av step 322, when it is determined that one or more defects do not exist in the blades or the sensors, then the control is transferred to step 322. At step 322, it is declared that defects exist in the blades or the sensors.

Figure 4:
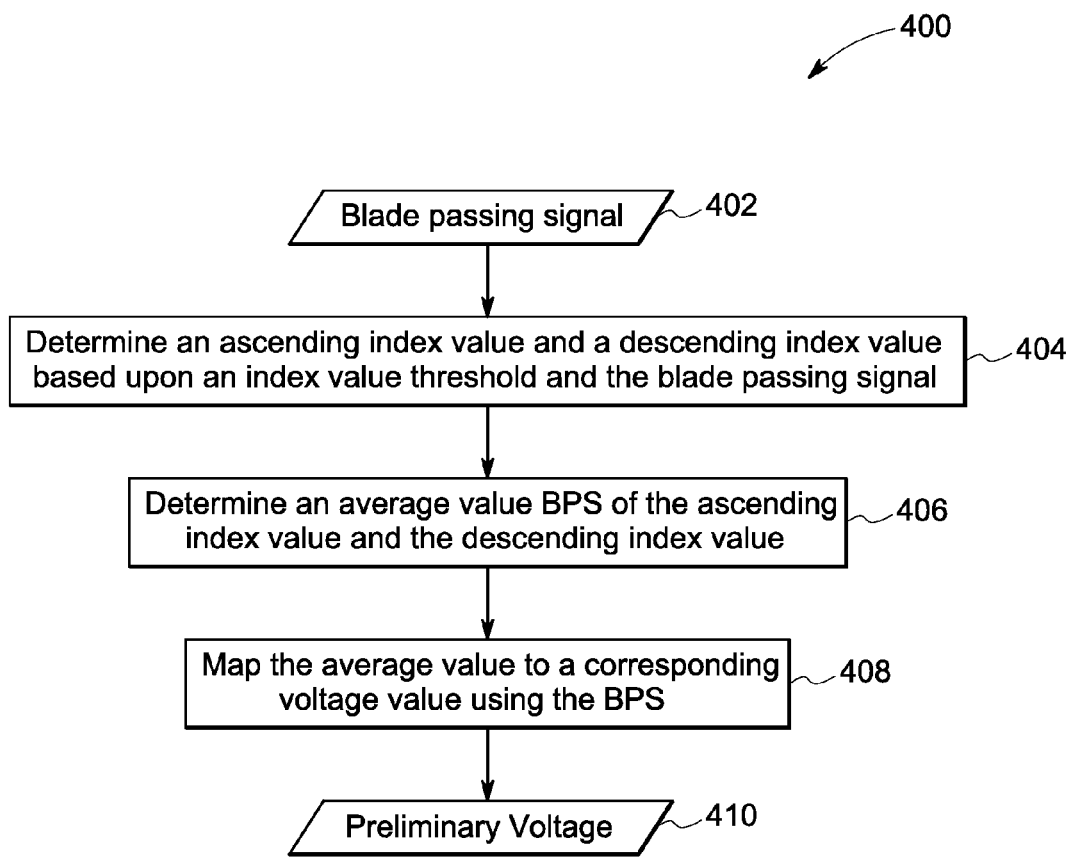
FIG. 4 is a flowchart illustrating an exemplary method for determination of preliminary voltages, in accordance with aspects of the present techniques.

FIG. 4 is a flowchart 400 illustrating an exemplary method for determination of preliminary voltages, in accordance with aspects of the present techniques. Particularly, FIG. 4 explains step 306 in FIG. 3 in greater detail. The preliminary voltages, for example, may be the preliminary voltages 308 (see FIG. 3). For ease of understanding, FIG. 4 explains determination of a single preliminary voltage 410 corresponding to a blade passing signal (BPS) 402. The BPS 402, for example, may be one of the BPS 24, 26 (see FIG. 1) or the BPS 200 (see FIG. 2). At step 404, an ascending index value and a descending index value corresponding to the BPS 402 is determined. The ascending index value and the descending index value are determined based upon the BPS 402 and an index value threshold. The index value threshold refers to a constant value corresponding to a device that is determined based upon the preliminary voltage of blades at rotating at turning gear speed. The determination of the ascending index value and the descending index value is explained in detail with reference to FIG. 5. At step 406, an average value of the ascending index value and the descending index value is determined. The average value is thereafter mapped to a corresponding voltage value using the blade passing signal 402 at step 408. Subsequently, at step 408, the corresponding voltage value is declared as the preliminary voltage 410. The determination of the ascending index value, the descending index value, the average value and the preliminary voltage is explained with reference to FIG. 5.

Figure 5:
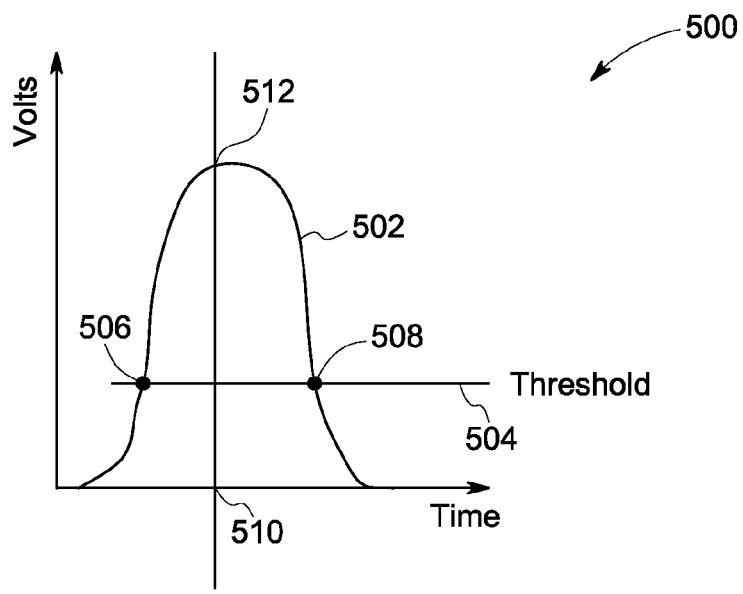
FIG. 5 is a graphical representation of a blade passing signal shown to describe determination of an ascending index value and a descending index value corresponding to a blade passing signal, in accordance with aspects of the present techniques.

Turning now to FIG. 5, a graphical representation 500 of a blade passing signal 502 is shown to describe determination of an ascending index value and a descending index value corresponding to the blade passing signal 502. The BPS 502, for example, may be one of the BPS 24, 26, 200, 402 (see FIG. 1, FIG. 2 and FIG. 4). Particularly, FIG. 5 explains step 404 in FIG. 4 in greater detail. As shown in FIG. 5, reference numeral 504 is representative of an index value threshold. As shown in FIG. 5, the index value threshold cuts through the blade passing signal 502 at two points 506, 508. In the presently contemplated configuration, a plurality of points located around the point 506 are interpolated to determine the ascending index value. Furthermore, a plurality of points located around the point 508 are interpolated to determine the descending index value. Furthermore, reference numeral 510 represents an average value of the ascending index value and the descending index value. The average 510 is thereafter mapped to a corresponding voltage 512 to determine the preliminary voltage 512.

FIG. 6 is a flowchart 600 that illustrates an exemplary method for determination of a clearance value 612 corresponding to a blade, in accordance with aspects of the present techniques. Particularly, FIG. 6 explains step 310 in FIG. 3 in greater detail. The clearance value 612, for example, may be one of the clearance values 312 (see FIG. 3). Reference numeral 602 is representative of a preliminary voltage. The preliminary voltage 602, for example, may be one of the preliminary voltages 308 (see FIG. 3). At step 604 one or more operational parameters 606 may be selected. In one embodiment, the operational parameters 606 may be selected by a user. In another embodiment, the operational parameters 606 may be selected once by a user, and thereafter the operational parameters 606 may be used by default. The operational parameters 606, for example, may be a subset of the operational parameters 309 (see FIG. 3). At step 608, one or more coefficients corresponding to the operational parameters and the clearance 612 may be determined. The one or more coefficients, for example, may be determined by varying experimental clearance values with respect to each of the operational parameters 606 while holding the rest of the operational parameters 606 constant.

Subsequently at step 610, the clearance value 612 corresponding to the preliminary voltage 602 may be generated. The clearance value 612, for example, may be generated by solving an empirical formula using the one or more coefficients, the preliminary voltage 602 and the operational parameters 606. An exemplary empirical formula is shown below in equation (1):

$$y = \left(\frac{1}{\text{gap}}\right)^{b_0} * (b_1 + b_2 * \text{speed}) * (CTIM)^{b_3} * (b_4 + b_5 * DWATT) \quad (1)$$

wherein y is a preliminary voltage, gap is a clearance of a blade, speed is an operational parameter that refers to the speed of a device that includes the blade, CTIM is an operational parameter that refers to the temperature of the device, DWATT is an operational parameter that refers to the Load of the device, $b_0$ is a coefficient corresponding to the clearance of the blade, $b_1$ and $b_2$ are coefficients corresponding to the speed of the blade, and $b_3$ is a coefficient corresponding to the temperature of the device, b4 and b5 are coefficients corresponding to Load of the device. The application of the empirical formula results in determination of the clearance 612 corresponding to the blade.

FIG. 7a, FIG. 7b and FIG. 7c are exemplary graphical representations of blade passing signals 702, 704, 706 that are shown for describing certain embodiments of preset rules. Particularly, FIG. 7a, FIG. 7b and FIG. 7c describe the preset rules referred to in step 314 in FIG. 3, in accordance with one embodiment of the present techniques. In one embodiment, the preset rule may include a condition, that when a blade passing signal, a preliminary voltage or a clearance value is less than a predetermined threshold and is less than zero, or the blade passing signal has a flat lined appearance, then a defect exists in a sensor. For example, as shown in FIG. 7a, the blade passing signal 702 has corresponding preliminary voltages that are less than a threshold 708 and are less than zero volts. Furthermore, as shown in FIG. 7(a), the BPS 702 has a flat lined appearance. Therefore, it may be declared that a defect exists in a sensor that generated the BPS 702.

Furthermore, an exemplary rule is explained with reference to FIG. 7(b). This rule includes a condition that when a blade passing signal corresponding to a blade is cropped for a minimum duration, then there may be a tip loss of the blade. As shown in FIG. 7(b), the blade passing signal 704 corresponding to the blade is cropped for a specific duration as shown by the reference numeral 712. Accordingly, it may be deduced that the blade may have a tip loss defect.

Still another exemplary preset rule may include a condition that when a plurality of preliminary voltages are less than a threshold for a predetermined duration, then there is a defect in a blade. As shown in FIG. 7© by reference numeral 714, a plurality of preliminary voltages are less than the threshold 708 for a specific period. Therefore, it may be deduced that there is a defect in the blade. It is noted that the preset rules explained with reference to FIG. 7(a), FIG. 7(b) and FIG. 7(c) are for exemplary purposes. It is noted that many other embodiments of the preset rules may exist.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a processing subsystem that:
determines preliminary voltages corresponding to a plurality of blades based upon blade passing signals by:
determining an ascending index value and a descending index value based on an index value threshold and a blade passing signal from the blade passing signals;
determining an average value of the ascending index value and the descending index value; and
mapping the average value to a corresponding voltage value based on the blade passing signal, wherein the corresponding voltage value is a preliminary voltage from the preliminary voltages;
generates a plurality of clearance values by normalizing the preliminary voltages for effects of one or more operational parameters,
wherein the plurality of clearance values are representative of clearance of the plurality of blades; and
monitors health of the plurality of blades based on the plurality of clearance values, wherein the processing subsystem generates one or more alarms based upon the plurality of the clearance values and generates the one or more alarms by applying a plurality of rules to the preliminary voltages, the plurality of clearance values, the blade passing signals, or combinations thereof.

2. The system of claim 1, wherein the processing subsystem normalizes the preliminary voltages by applying an empirical formula to the preliminary voltages, the one or more operational parameters, or combinations thereof.

3. The system of claim 1, further comprising:
a device comprising the plurality of blades; and
a plurality of sensors that are in an operational communication with the processing subsystem,
wherein the plurality of sensors generate the blade passing signals.

4. The system of claim 3, wherein the one or more operational parameters comprise a speed of the device, a temperature of the device at the time of generation of the blade passing signals, an inlet guide vane parameter, compressor inlet temperature (CTIM), load (DWATT), or combinations thereof.

5. The system of claim 4, wherein the device comprises a compressor, an axial compressor, a turbine or a turbine engine.

6. The system of claim 1, wherein the one or more alarms indicate one or defects in the plurality of blades or one or more defects in the plurality of sensors.

7. The system of claim 1, further comprising an onsite monitoring device that generates the one or more operational parameters.

8. The system of claim 1, further comprising a display device that displays the blade passing signals, the preliminary voltages, the plurality of clearance values, one or more intermediate processes or values, one or more alarms, or combinations thereof.

9. A turbine engine system, comprising:
a compressor comprising a plurality of blades;
a plurality of magnetic sensors that are placed around a casing of the plurality of blades, wherein the plurality of magnetic sensors generate blade passing signals; and
a processing subsystem that is in an operational communication with the plurality of magnetic sensors, wherein the processing subsystem:
determines preliminary voltages corresponding to the plurality of blades based upon the blade passing signals by:
determining an ascending index value and a descending index value based on an index value threshold and a blade passing signal from the blade passing signals;
determining an average value of the ascending index value and the descending index value; and
mapping the average value to a corresponding voltage value based on the blade passing signal, wherein the corresponding voltage value is a preliminary voltage from the preliminary voltages;

generates a plurality of clearance values by normalizing the preliminary voltages for effects of one or more operational parameters, wherein the plurality of clearance values are representative of clearance corresponding to the plurality of blades; and monitors health of the plurality of blades based on the plurality of clearance values, wherein the processing subsystem generates one or more alarms based upon the plurality of the clearance values and generates the one or more alarms by applying a plurality of rules to the preliminary voltages, the plurality of clearance values, the blade passing signals, or combinations thereof.

10. A method, comprising:

determining preliminary voltages corresponding to a plurality of blades based upon blade passing signals by:

determining an ascending index value and a descending index value based on an index value threshold and a blade passing signal from the blade passing signals;

determining an average value of the ascending index value and the descending index value; and mapping the average value to a corresponding voltage value based on the blade passing signal, wherein the corresponding voltage value is a preliminary voltage from the preliminary voltages;

generating a plurality of clearance values by normalizing the preliminary voltages for effects of one or more operational parameters, wherein the plurality of clearance values are representative of clearance of the plurality of blades; and monitoring health of the plurality of blades based on the plurality of clearance values, wherein the processing subsystem generates one or more alarms based upon the plurality of the clearance values and generates the one or more alarms by applying a plurality of rules to the preliminary voltages, the plurality of clearance values, the blade passing signals, or combinations thereof.

11. The method of claim 10, wherein normalizing the preliminary voltages comprises applying an empirical formula to the preliminary voltages and the one or more operational parameters to generate the plurality of clearance values.

12. The method of claim 11, wherein normalizing the preliminary voltages further comprises:

determining one or more coefficients corresponding to the one or more operational parameters and the plurality of clearance values; and solving the empirical formula by inserting the one or more coefficients, the one or more operational parameters and the preliminary voltages.

13. The method of claim 12, wherein the one or more coefficients are determined based upon domain knowledge, a category of device that includes the plurality of blades, regression functions, or combinations thereof.

\* \* \* \* \*